United States Patent
Steffan

(10) Patent No.: US 7,512,827 B2
(45) Date of Patent: Mar. 31, 2009

(54) DUAL MODULE CLOCK SUPPLY FOR CAN COMMUNICATION MODULE

(75) Inventor: Peter Steffan, Volkenschwand/Neuhausen (DE)

(73) Assignee: Texas Instruments Incorporated, Dallas, TX (US)

( * ) Notice: Subject to any disclaimer, the term of this patent is extended or adjusted under 35 U.S.C. 154(b) by 314 days.

(21) Appl. No.: 11/314,994

(22) Filed: Dec. 21, 2005

(65) Prior Publication Data

US 2006/0142061 A1    Jun. 29, 2006

(30) Foreign Application Priority Data

Dec. 23, 2004  (DE) ................. 10 2004 062 210

(51) Int. Cl.
*G06F 1/04* (2006.01)
(52) U.S. Cl. ................. 713/501; 713/500; 713/503; 713/600
(58) Field of Classification Search ............. 713/500, 713/501; 455/557, 560
See application file for complete search history.

(56) References Cited

U.S. PATENT DOCUMENTS

| | | | | |
|---|---|---|---|---|
| 5,574,848 A | * | 11/1996 | Thomson | 714/2 |
| 5,600,782 A | * | 2/1997 | Thomson | 714/4 |
| 6,404,834 B1 | * | 6/2002 | Hardin et al. | 375/376 |
| 6,990,594 B2 | * | 1/2006 | Kim | 713/322 |
| 7,010,619 B2 | * | 3/2006 | Vowe | 709/250 |
| 7,076,517 B2 | * | 7/2006 | Bartling | 709/200 |
| 7,284,143 B2 | * | 10/2007 | Song et al. | 713/503 |

FOREIGN PATENT DOCUMENTS

DE     4041625 C2    12/1990
WO    01/22588 A1    9/1999

OTHER PUBLICATIONS

C_CAN user's manual revision 1.2, dated Jun. 6, 2000, by Rober Bosch Gmbh.*

* cited by examiner

*Primary Examiner*—Nitin C Patel
(74) *Attorney, Agent, or Firm*—William B. Kempler; Frederick J. Telecky, Jr.; Wade J. Brady III

(57) ABSTRACT

A CAN communication module (10) comprising a protocol kernel (14) and a CAN logic block (12) is provided. The protocol kernel includes a CAN bus interface and the CAN logic block includes a module interface for connection to an external peripheral bus (22), a message RAM (28) and a CAN message handler (26). The protocol kernel (14) and the CAN logic block (12) have separate clock inputs (32,36).

15 Claims, 1 Drawing Sheet

DUAL MODULE CLOCK SUPPLY FOR CAN COMMUNICATION MODULE

CROSS REFERENCE TO RELATED APPLICATIONS

This application claims priority under 35 USC § 119 of German Application Serial No. 10 2004 062210.8, filed Dec. 23, 2004.

FIELD OF THE INVENTION

The present invention relates to a Controller Area Network (CAN) communication module.

BACKGROUND OF THE INVENTION

In a Controller Area Network (CAN), each node is connected to the serial CAN bus through an associated CAN communication module. The CAN communication module is the link between the CAN bus with its communication in accordance with the CAN protocol and a connected device. The connected device has a controller with a central processing unit (CPU) and a bus to which the communication module is connected through its module interface. Messages to be exchanged between the CAN bus and the CPU are buffered in a message RAM, also referred to as "Mailbox" RAM. To avoid any read/write conflicts at the message RAM and at the registers of the module interface, the conditions of these elements must be monitored. In order to reduce the CPU load, a CAN message handler is provided which performs all functions concerning safe message handling.

One requirement of the CAN protocol is bit timing. The nominal bit time is equal to 1 divided by the bit rate, which can be up to 1 MBit/s. The nominal bit time is divided into a synchronization segment, a propagation time segment and two phase buffer segments, the sample point being intermediate the two phase buffer segments. Since the bit timing is directly influenced by the clock used in the communication module, a clock signal with a frequency jitter of not more than 1.5% is needed for proper operation of the module. For more details, reference is made to the ISO 11898 standard.

In specific environments such as in automotive applications, low electromagnetic interference (EMI) is a requirement. Since electromagnetic interference depends on the frequency distribution, embedded systems are provided with a frequency modulated system clock to spread the spectrum of emitted frequencies. For an effective attenuation of the EMI, a clock frequency variation up to 10% may be used. While many systems are able to operate properly with a system clock that has a large frequency jitter, in a conventional CAN communication module, a frequency modulated system clock would be in conflict with the requirement of the clock frequency jitter being not more than 1.5%. Attempts to supply the CAN communication module with a jittery clock have resulted in limited bit timing setups. These solutions are problematic in terms of conformance to the CAN Standard and entail expensive conformance tests for each application's CAN bit timing setup.

SUMMARY OF THE INVENTION

The present invention provides a CAN communication module that comprises a protocol kernel and a CAN logic block. The protocol kernel includes a CAN bus interface and the CAN logic block includes a module interface for connection to an external peripheral bus, a message RAM and a CAN message handler. According to the invention, the protocol kernel and the CAN logic block have separate clock inputs. The protocol kernel can thus be supplied with a clock signal that has a low frequency jitter and may have a relatively low clock frequency, and the CAN logic block can be supplied with a clock signal that has a modulated clock frequency and may be of a relatively high frequency in view of performance requirements. Accordingly, the bit timing is not affected by the jittery clock used in the CAN logic block (the "logic clock"), and yet the resulting EMI is minimized by spreading the frequency spectrum of the logic clock.

In a preferred embodiment of the invention, a clock generator is used that has a fixed frequency oscillator which supplies a low jitter clock signal, and has a frequency modulation phase locked loop circuit (PLL) with a reference input receiving the low jitter clock signal. The frequency modulation PLL provides a logic clock signal which may have a frequency that is a multiple of the low jitter clock signal. The clock input of the protocol kernel is connected to the low jitter clock output and the clock input of the CAN logic block is connected to the logic clock output of the clock generator.

The CAN communication module of the invention is fully compliant with the CAN Standard for all possible CAN bit timings so that expenses for conformance tests can be minimized. The logic block of the module can be supplied with a jittery clock of a relatively high frequency to allow high performance features with reduced electromagnetic interference (EMI). For providing both of the logic clock and the kernel clock, only a PLL is needed in addition to the clock oscillator. The increase in module size over a conventional module with a single clock input is negligible.

DETAILED DESCRIPTION OF THE DRAWINGS

Figure 1:
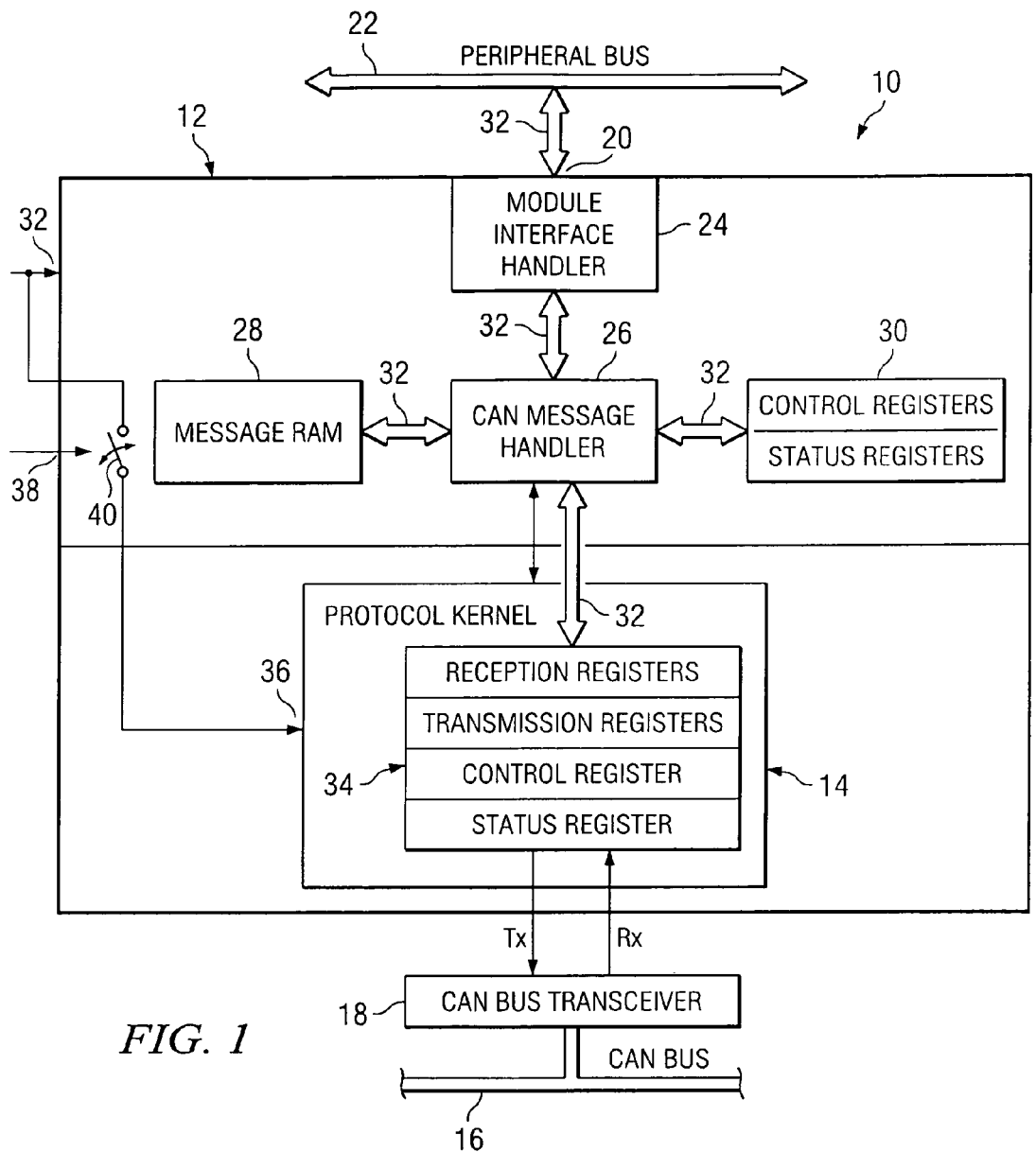
FIG. 1 is a schematic block diagram of a CAN communication module.

With reference to FIG. 1, a CAN communication module 10 comprising a CAN logic block 12 and a protocol kernel 14 is shown, through which a node in a CAN network may be connected to a CAN bus. CAN communication module 10 together with the protocol kernel 14 is a peripheral module in an embedded microcontroller system or may be a separate integrated chip. Protocol kernel 14 includes a CAN bus interface with a serial output TX for sending signals to a CAN bus 16 and a serial input RX for receiving signals from CAN bus 16. For transmission purposes output TX and input RX are connected to CAN bus 16 via a CAN bus transceiver 18 which guarantees a connection to the physical layer. CAN logic block 12 includes a 32 bit wide parallel module interface 20 connected to a peripheral bus 22.

CAN logic block 12 includes the following principal blocks: a module interface handler 24, a CAN message handler 26, a message RAM 28 and control and status registers 30. The module interface handler 24 is connected to the parallel interface which is shown as a 32-bit interface. This interface must be adapted to the peripheral bus used and may as well be a 8- or 16-bit interface. Module interface handler 24 is interconnected with CAN message handler 26. The CAN message handler 26 is interconnected with message RAM 28 and control and status registers 30. The CAN logic block 12 receives a logic clock at a clock input 32.

In operation, a CPU is connected via the peripheral bus 22 to CAN logic block 12. Message objects used in a CAN network and identifier masks which are used for acceptance filtering of received messages are stored in the message RAM 28. All functions concerning the handling of messages are implemented in the message handler 26 which is a state machine. In the control register 30 configuration data for the message handler are stored, while the status register 30 is used e.g. for error flags. All data processing in the blocks of CAN logic block 12 and all data transmission between these blocks is timed by the logic clock received at clock input 32. In order to guarantee the performance required, the frequency of this logic clock can be up to 100 MHz. In embedded systems with CPU and module clocks as high as 100 MHz, the electromagnetic interference requirements are often only met by frequency modulating the clock frequency. Therefore, the logic clock fed into clock input 32 is a frequency modulated clock of a frequency up to 100 MHz.

Protocol kernel 14 is connected to the CAN message handler 26 of the CAN logic block 12 via a parallel 32-bit connection. Protocol kernel 14 includes reception, transmission, control and status registers 34. It receives a kernel clock at a clock input 36. In the protocol kernel 14 a parallel/serial conversion of the messages is performed. The bit rate at the serial output can be up to 1 Mbit/s depending on the CAN system in which the CAN communication module 10 is used. Another important task of protocol kernel 14 is the bus arbitration which is specified in the ISO 11898 standard. The bitwise arbitration resolves bus access conflicts by comparing identifiers which are included in each frame. Protocol kernel 14 also performs the bit timing required by the CAN protocol. ISO 11898 standard states, that it must be possible to divide the nominal bit time at least by 8 to get a synchronization segment, a propagation time segment and two phase buffer segments with specific durations. Thus, the frequency of the kernel clock must be at least 8 MHz to achieve the maximal baudrate of 1 Mbit/s. Furthermore, the standard states a maximum oscillator tolerance of 1.58%. Therefore, the kernel clock fed to clock input 36 is a low jitter clock with a relatively low frequency with a minimum of 8 MHz.

A switch 40 allows to switch clock input 36 to clock input 32, thus having the same clock for logic block 12 and protocol kernel 14, or to connect clock input 36 to the separate clock input 38. Switch 40 gives the flexibility to use the same clock for example in an application, in which the EMI requirements on the logic clock are not important and a jitter free clock or a clock with only a low jitter may be used as logic clock and at the same time as kernel clock.

Figure 2:
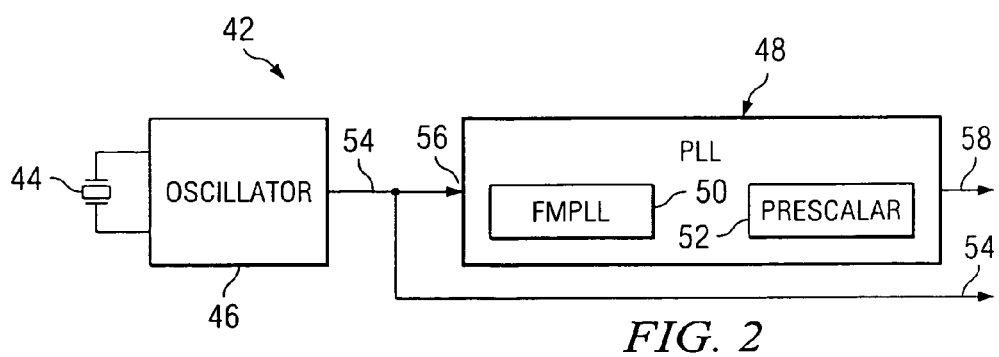
FIG. 2 is a block diagram of a dual clock generator.

In the inventive CAN communication module, the clock signals which are input at logic clock input 32 and kernel clock input 36 are produced by a dual clock generator 42 as shown in FIG. 2. The dual clock generator 42 comprises a quartz resonator 44, a fixed frequency oscillator 46 and a phase locked loop 48. Phase locked loop 48 comprises a frequency modulated phase locked loop 50 and a prescaler 52. Fixed frequency oscillator 46 with the connected quartz resonator 44 outputs a low jitter clock signal 54 at a relatively low frequency with a minimum of 8 MHz. This low jitter clock signal 54 is output to kernel clock input 38 and to a reference input 56 of phase locked loop 48, where the signal is frequency modulated. An output from frequency modulated phase locked loop 50 is connected to prescaler 52. Frequency modulated phase locked loop 50 multiplies the oscillator signal frequency 54 (by 1, 2, 4 or 8). The output from frequency modulated phase locked loop 50 can subsequently been divided by a prescale value of 1, 2, 4 or 8 and outputs a logic clock output signal 58, which is fed to logic clock input 32. Logic clock output signal 58 is a clock signal with a frequency up to 100 MHz and frequency modulated in a way to fulfil the EMI requirements. This logic clock output signal can also be used as clock signal to the CPU and other peripheral modules in the system.

In a preferred embodiment, the frequency modulated phase locked loop 50 can be adapted to operate in a first mode with a high frequency jitter and in a second mode with a low frequency jitter. Alternatively, the frequency modulation can be switched off. In an environment with low EMI requirements, a jitter free logic clock or a logic clock with only a low frequency jitter may be used as well for protocol kernel 14 as for CAN logic block 12. In this case, switch 40, which is shown in FIG. 1, connects clock input 36 of protocol kernel 14 to clock input 32 of CAN logic block 12 and only one clock is used for CAN communication module 10.

The invention claimed is:

1. A CAN communication module (10), comprising:
a protocol kernel (14) and a CAN logic block (12);
the protocol kernel (14) including a CAN bus interface; and
the CAN logic block (12) including a module interface for connection to an external peripheral bus (22), a message RAM (28) and a CAN message handler (26), wherein the protocol kernel (14) and the CAN logic block (12) have separate clock inputs (32,36);
a clock generator (42) with a fixed frequency oscillator that supplies a low jitter clock output (54); and
a frequency modulation phase locked loop circuit (50) with a reference input (56) receiving the low jitter clock output (54) and with a logic clock output (58);
wherein the clock input (36) of the protocol kernel (14) is connected to the low jitter clock output (54) and the clock input (32) of the CAN logic block (12) is connected to the logic clock output (58).

2. The communication module (10) according to claim 1, wherein the clock generator (42) is adapted to selectively operate in a first mode with a high 20 jitter or a second mode with a low jitter.

3. A CAN communication module (10), comprising:
a protocol kernel (14) and a CAN logic block (12);
the protocol kernel (14) including a CAN bus interface; and
the CAN logic block (12) including a module interface for connection to an external peripheral bus (22), a message RAM (28) and a CAN message handler (26), wherein the protocol kernel (14) and the CAN logic block (12) have separate clock
input terminals for connection to a low jitter clock connected to the clock input terminal for the protocol kernel and a high jitter clock connected to the clock input terminal for the CAN logic block; and a switch (40) for selectively connecting the clock input (36) of the protocol kernel (14) to either of the clock input terminals.

4. In a CAN communications module comprising a protocol kernel and a CAN logic block, a clock generation system comprising:
a first clock generator generating a low jitter clock; and
a second clock generator generating a high jitter clock, wherein the low jitter clock is connected to a clock input for the protocol kernel and the high jitter clock is connected to the CAN logic block.

5. The clock generation system of claim 4 wherein the first clock generator is a fixed frequency oscillator.

6. The clock generation system of claim 5 wherein the first clock generator is a quartz crystal oscillator.

7. The clock generation system of claim 4 wherein the second clock generator generates the high jitter clock from an output of the first clock generator.

8. The clock generation system of claim 4 wherein the second clock generator includes a frequency modulation phase lock loop circuit receiving the low jitter clock and outputting a high jitter clock.

9. The clock generation system of claim 4 wherein the first clock generator generates a clock at substantially 8 MHz.

10. The clock generation system of claim 4 wherein the second clock generator generates a clock at substantially 100 MHz.

11. The clock generation system of claim 9 wherein the second clock generator generates a clock at substantially 100 MHz.

12. The clock generation system of claim 5 wherein the second clock generator generates the high jitter clock from an output of the first clock generator.

13. The clock generation system of claim 7 wherein the second clock generator includes a frequency modulation phase lock loop circuit receiving the low jitter clock and outputting a high jitter clock.

14. The clock generation system of claim 13 wherein the first clock generator generates a clock at substantially 8 MHz.

15. The clock generation system of claim 14 wherein the second clock generator generates a clock at substantially 100 MHz.

* * * * *